Feb. 25, 1969 H. WIEGAND ET AL 3,429,700
METHOD OF PRODUCING COMPOSITE METAL ARTICLES BY UNITING
TWO IDENTICAL SHAPES
Filed Sept. 20, 1966

INVENTORS
Albert F. Salter
& Hans Wiegand
Barnard, McGlynn & Reising
ATTORNEYS

United States Patent Office 3,429,700
Patented Feb. 25, 1969

3,429,700
METHOD OF PRODUCING COMPOSITE METAL ARTICLES BY UNITING TWO IDENTICAL SHAPES
Hans Wiegand, Boyertown, and Albert F. Salter, Lansdale, Pa., assignors to Teleflex Incorporated, North Wales, Pa., a corporation of Delaware
Filed Sept. 20, 1966, Ser. No. 580,754
U.S. Cl. 75—208      3 Claims
Int. Cl. B22f 7/02; B23p 15/14

ABSTRACT OF THE DISCLOSURE

The invention relates to a method for making a metal article wherein two powdered metal sections of substantially identical composition and shape and with interacting projections and depressions are brought together and then simultaneously sintered and bonded together to form a unitary body.

---

This invention relates to an improved method for making and an improved structure for metal articles of manufacture. The invention finds its chief utility for the manufacture of heavy-duty metal pulley wheels for flexible cable operated control mechanisms and the like and will be described in detail with reference thereto; however it will be manifest that the method and structure can be utilized for other types of metal articles.

Various types of flexible cable operated control mechanisms incorporate a metal pulley wheel having helical gear teeth which engages a spirally wound multiple wire cable whereby rotary motion of the pulley wheel is translated to linear motion of the cable, or vice versa. Hence, a hand crank, electric motor or the like may be used to turn the pulley wheel the rotation of the pulley wheel causing linear motion of the flexible cable, the end or ends of which may be connected to the member desired to be moved or controlled either directly or through a similar rotary member to which the linear motion of the cable imparts rotary motion. Slippage between the rotary member and the cable is prevented by the mated engagement of the helical teeth on the pulley wheel and the spiral or helical grooves which are inherent to the wrapped multiple wire structure of the cable. The pulley wheel must, of course, have a circumferential radially inwardly extending groove in the outer periphery thereof for nesting and retention of the cable thereon and with the helical gear teeth being formed within this groove. For light duty control mechanisms of this type, the pulley wheels are conventionally zinc die castings which can be manufactured at low cost despite the rather complex shape. However, for heavy duty control mechanisms of this type it is essential or at least desirable that the pulley wheels be made of high strength ferrous base metal such as iron or steel. This has heretofore required that the wheels be manufactured from metal blanks by machining operations and such machining operations are expensive.

It is the principal object of the present invention to provide an improved structure and method which enables low cost manufacture of such pulley wheels and similar types of metal articles. More specifically, it is an object of the invention to provide an improved low cost pulley wheel of the type described which is formed of sintered powdered metal. Another object is the provision of a low cost method for manufacturing pulley wheels, and similar articles, of sintered powdered metal and without requirement for expensive machining operations.

Briefly, these objects are accomplished in accordance with the most preferred embodiment to the invention by a method which includes the steps of (1) forming metal powder round compacts of axial halves of the wheel, (2) placing the two axial halves of the wheel together to thereby form the complete wheel and (3) heating to sinter the metal. To provide increased strength by way of a better bond between the two wheel halves in the sintering operation, it is preferable to provide the mating surfaces of the wheel halves with mating projections and depressions. These projections and depressions on the wheel halves can serve the further purpose of assuring the desired alignment of the helical teeth portions on the one wheel half with the helical teeth portions on the other wheel half. Ideally the two wheel halves should be of identical shape so that they can be made in the same metal powder tamping or compressing die thereby minimizing tooling costs. To accomplish this requires that on each wheel half the number of projections equal the number of depressions, this being another feature of the preferred embodiment of the invention.

It will be seen, therefore, that by means of the invention excellent high strength pulley wheels of iron, steel or other sinterable metal can be manufactured at low cost with minimum tool requirements and without need for machining operations to form the pulley groove or the helical teeth.

Other objects, features and advantages of the invention will appear more clearly from the following detailed description of a preferred embodiment thereof, made with reference to the drawings in which.

Figure 1:
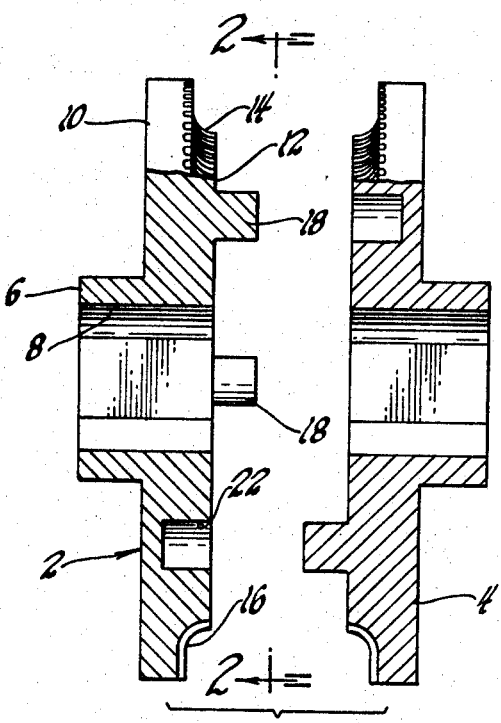
FIGURE 1 is a side elevational view in partial section of two wheel halves before they are mated and joined, and is illustrative of the method and structure of the invention.

Referring now to FIGURE 1, the two round wheel halves, 2 and 4, are metal powder compacts and are of identical shape but oriented, as shown, 180° with respect to each other. Referencing the description of both wheel halves to that shown at 2, each is of generally annular shape having a hub portion 6 with a bore 8, and a rim portion 10 the inner surface 12 of which is formed with a peripheral circumferential groove 14 of generally arcuate cross-section, the groove 14 having circumferentially equally spaced helical gear teeth 16 completely therearound. The inner flat surface 12 also has formed thereon a pair of cylindrical projections 18 and 20 separated by an angle of 90° and two cylindrical depressions, 22 and 24, also separated by an angle of 90° and each therefore diametrically opposite one of the projections 18 and 20. The projections and depressions are of such diameter as to be suited for close mated engagement with the depressions and projections, respectively, on the other wheel half 4. Preferably the length of each projection is slightly less than the depth of the depression into which it mates to assure that when the two wheel halves are fitted together the inner flat sides 12 thereof will be in abutting relationship irrespective of any gathering of tolerances in the precise lengths or depths of the projections and depressions.

The round powdered metal compacts 2 and 4 which constitute the wheel halves can be made by placing a measured charge of steel or other sinterable metal powder in a two-part matched tamping die the cavity of which is, of course, identical in shape to the shape of the wheel halves. In accordance with conventional practice it is generally desirable to uniformly admix a small amount of organic material with the metal powder, for example approximately 1% by weight stearate soap or the like, to serve in the nature of a lubricant to allow the metal particles to slide with respect to each other and hence attain good compaction and to add green strength to the formed compacts. Also, it is generally desirable that the metal powder include a variety of grain sizes, some below and some above 325 mesh, in order to attain optimum compaction. A pressure on the order of 60,000 to 80,000 pounds per square inch can be used in the compaction operation.

Figure 3:
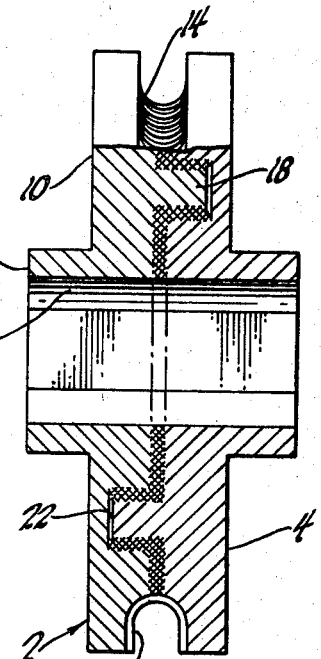
FIGURE 3 is a side elevational view in partial section of a completed pulley wheel made in accordance with the invention.
Figure 2:
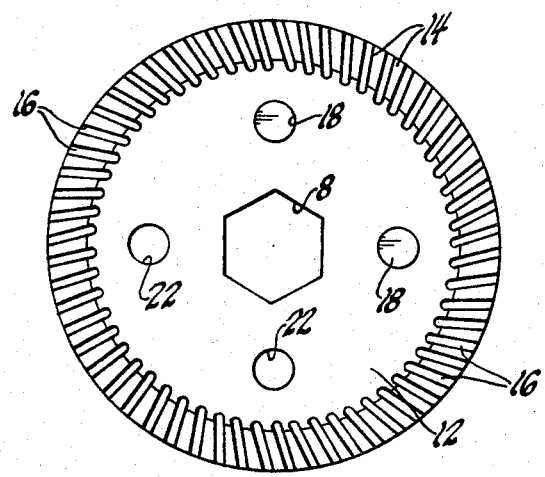
FIGURE 2 is an elevational view of one of the wheel halves shown in FIGURE 1, taken on the line 2—2.

The two round metal powder compact wheel halves 2 and 4, so formed, are next mated together with the projections 18 and 20 of one wheel half fitting snugly into the depressions 22 and 24 of the other wheel half and the resulting assembly is heated, preferably in a non-oxidizing atmosphere such as hydrogen, to cause sintering of the powdered metal. The precise temperature used for this sintering operation will, of course, depend upon the composition of the metal powder. For iron or steel, a temperature on the order of 1800° F. to 2100° F. is satisfactory. During this operation the two wheel halves are strongly bonded together by way of the sintering thereby forming a unitary body. This is shown in FIGURE 3, the width of the junction between the two wheel halves being somewhat exaggerated in the drawing to illustrate the merger and bonding which takes place. The location of the mating projections and depressions is such that the desired alignment of the helical teeth portions on the two wheel halves is accomplished when the two wheel halves are fitted together prior to sintering. Also, the mating projections and depressions serve the further and more important function of strengthening the bond between the two wheel halves.

Various modifications are possible. For example, the precise location and shapes of the mating depressions and projections described, while desirable, are not essential. They can be other than cylindrical in shape and their angular orientation can be varied. To illustrate the latter, the two projections can, if desired, be separated by 180° and the two depressions likewise separated by 180°. Likewise, the number of projections and depressions can be varied. For example, a single stud and a single depression can be used on each wheel half. However, for minimum tooling costs it is always desirable that the two wheel halves be identical in shape and hence the number of depressions should equal the number of projections on each wheel half and with the proper orientation between them to enable the mated engagement of the two wheel halves.

If desired a brazing material may be applied to the mating faces of the two wheel halves prior to the sintering operation to thereby further assure a good bond. As another variation, which has the disadvantage of some added expense, each wheel half can be sintered individually and the two sintered wheel halves then mated and brazed together to form the unitary body in a subsequent heating operation prior to which brazing material is applied to the abutting faces of the two sintered wheel halves. Hence it will be understood that while the invention has been described in detail with reference to a specific preferred embodiment thereof, various changes and modifications may be made all within the full and intended scope of the claims which follow.

The embodiments of the invention in which an exclusive property or privilege is claimed are defined as follows:

1. A method for manufacturing a metal article comprising forming at least two compacted metal powder sections of substantially identical composition and shape, each of said sections having at least one projection and at least one depression therein, assembling said sections together with each projection of each said sections being mated snugly into a depression of the other of said sections being mated snugly into a depression of the other of said sections, and subsequently heating said assembled sections to the sintering temperature of the metal powder to simultaneously sinter said metal powder and bond said sections together to form a unitary body.

2. A method for manufacturing a metal wheel having a circumferential radially inwardly extending groove in the periphery thereof said method comprising forming two round compacted metal powder wheel halves of substantially identical composition and shape, each of said wheel halves having a peripheral circumferential groove and having at least one projection and at least one depression therein, assembling said wheel halves together such that the peripheral circumferential groove in each of said wheel halves is aligned with the peripheral circumferential groove in the other of said wheel halves to thereby provide said circumferential radially inwardly extending groove, and said assembly also being such that each projection of each of said wheel halves is mated snugly into a depression of the other of said wheel halves, and subsequently heating said assembled wheel halves to the sintering temperature of said metal powder to simultaneously sinter said metal and bond said sections together to form a unitary wheel.

3. A method as set forth in claim 2 wherein the circumferential peripheral groove in each of said wheel halves is provided with circumferentially spaced teeth and wherein said projections and depressions are so oriented as to cause the teeth in each of said wheel halves to be aligned with teeth in the other of said wheel halves when said wheel halves are assembled.

References Cited
UNITED STATES PATENTS

| | | | |
|---|---|---|---|
| 2,267,918 | 12/1941 | Hildabolt | 78—208 X |
| 2,703,750 | 3/1955 | Cotter | 75—208 X |
| 2,940,163 | 6/1960 | Davies | 29—182.2 |
| 3,087,814 | 4/1963 | Smiley | 75—208 |
| 3,123,471 | 3/1964 | Marshall | 75—208 |
| 3,150,974 | 9/1964 | Lund | 75—208 |
| 3,244,515 | 4/1966 | Grune | 75—208 |
| 3,320,663 | 8/1967 | Haller | 75—208 |
| 3,335,001 | 8/1967 | Drew | 75—214 |
| 3,359,622 | 12/1967 | Meyer | 75—208 |
| 3,360,348 | 12/1967 | Schreiner | 29—182.1 |

FOREIGN PATENTS

| | | |
|---|---|---|
| 688,497 | 6/1964 | Canada. |
| 671,543 | 5/1952 | Great Britain. |

BENJAMIN R. PADGETT, *Primary Examiner.*

A. J. STEINER, *Assistant Examiner.*

U.S. Cl. X.R.

29—159.2, 420, 463